(12) United States Patent
Pala et al.

(10) Patent No.: US 9,056,549 B2
(45) Date of Patent: Jun. 16, 2015

(54) HAPTIC TRACKING REMOTE CONTROL FOR DRIVER INFORMATION CENTER SYSTEM

(75) Inventors: Silviu Pala, Birmingham, MI (US); Yuji Motoyama, West Bloomfield, MI (US)

(73) Assignee: DENSO International America, Inc., Southfield, MI (US)

( * ) Notice: Subject to any disclaimer, the term of this patent is extended or adjusted under 35 U.S.C. 154(b) by 798 days.

(21) Appl. No.: 12/079,871

(22) Filed: Mar. 28, 2008

(65) Prior Publication Data

US 2009/0244017 A1    Oct. 1, 2009

(51) Int. Cl.
| | | |
|---|---|---|
| G06F 3/041 | (2006.01) | |
| B60K 37/06 | (2006.01) | |
| B60K 35/00 | (2006.01) | |
| G06F 3/01 | (2006.01) | |

(52) U.S. Cl.
CPC .............. *B60K 37/06* (2013.01); *B60K 35/00* (2013.01); *B60K 2350/1024* (2013.01); *B60K 2350/1028* (2013.01); *G06F 3/016* (2013.01)

(58) Field of Classification Search
None
See application file for complete search history.

(56) References Cited

U.S. PATENT DOCUMENTS

| | | | |
|---|---|---|---|
| 7,126,583 B1* | 10/2006 | Breed | 345/158 |
| 2003/0184574 A1 | 10/2003 | Phillips et al. | |
| 2004/0024311 A1 | 2/2004 | Quaid, III | |
| 2004/0034282 A1 | 2/2004 | Quaid, III | |
| 2004/0034283 A1 | 2/2004 | Quaid, III | |
| 2004/0034302 A1 | 2/2004 | Abovitz et al. | |
| 2004/0106916 A1 | 6/2004 | Quaid et al. | |
| 2005/0116940 A1 | 6/2005 | Dawson | |
| 2005/0168449 A1* | 8/2005 | Katayose | 345/173 |
| 2006/0097994 A1* | 5/2006 | Miyakoshi | 345/173 |
| 2006/0142657 A1 | 6/2006 | Quaid et al. | |
| 2006/0164383 A1 | 7/2006 | Machin et al. | |
| 2006/0179056 A1 | 8/2006 | Rosenberg | |
| 2006/0192771 A1* | 8/2006 | Rosenberg et al. | 345/173 |
| 2006/0227065 A1 | 10/2006 | Yukawa et al. | |

(Continued)

FOREIGN PATENT DOCUMENTS

| | | |
|---|---|---|
| JP | 9-026850 | 1/1997 |
| JP | 2000-006687 | 1/2000 |

(Continued)

OTHER PUBLICATIONS

Office Action dated Sep. 4, 2012 in the corresponding JP Application No. 2009-066505 with English translation thereof.

(Continued)

*Primary Examiner* — Seokyun Moon
(74) *Attorney, Agent, or Firm* — Harness, Dickey & Pierce, P.L.C.

(57) ABSTRACT

A control interface system for a driver of a vehicle comprises a touchscreen, a control module, and a display. The touchscreen is located proximate to the driver of the vehicle and upon driver interaction therewith is operable to generate a sensor signal. The control module is adapted to receive the sensor signal from the touchscreen and is operable to initiate control of a vehicle function and to generate a haptic feedback signal in response thereto. The touchscreen is adapted to receive the haptic feedback signal from the control module and is operable to provide haptic feedback to the driver of the vehicle in response thereto. The display is embedded in an instrument panel of the vehicle and provides an indicia of the vehicle function controlled by the touchscreen and of driver interaction therewith.

25 Claims, 14 Drawing Sheets

(56) References Cited

U.S. PATENT DOCUMENTS

| | | |
|---|---|---|
| 2006/0284839 A1 | 12/2006 | Breed et al. |
| 2007/0106457 A1 | 5/2007 | Rosenberg |
| 2007/0142751 A1 | 6/2007 | Kang et al. |
| 2007/0146341 A1 | 6/2007 | Medler et al. |
| 2007/0146342 A1 | 6/2007 | Medler et al. |
| 2007/0146343 A1* | 6/2007 | Prados ............ 345/173 |
| 2007/0152980 A1 | 7/2007 | Kocienda et al. |
| 2007/0152984 A1 | 7/2007 | Ording et al. |
| 2007/0157089 A1 | 7/2007 | Van Os et al. |
| 2007/0202841 A1 | 8/2007 | Cruz-Hernandez et al. |
| 2007/0204004 A1 | 8/2007 | Coyer et al. |
| 2007/0232348 A1 | 10/2007 | Tierling et al. |
| 2007/0236449 A1 | 10/2007 | Lacroix et al. |
| 2007/0236450 A1 | 10/2007 | Colgate et al. |
| 2007/0236474 A1* | 10/2007 | Ramstein ............ 345/173 |
| 2009/0167704 A1* | 7/2009 | Terlizzi et al. ............ 345/173 |

FOREIGN PATENT DOCUMENTS

| | | |
|---|---|---|
| JP | 2000-203356 | 7/2000 |
| JP | 2000-222139 | 8/2000 |
| JP | 2002-229708 | 8/2002 |
| JP | 2003-272463 | 9/2003 |
| JP | 2004-071233 | 3/2004 |
| JP | 2004-345549 | 12/2004 |
| JP | 2005-254972 | 9/2005 |
| JP | 2005-255906 | 9/2005 |
| JP | 2006-010457 | 1/2006 |
| JP | 2008-065518 | 3/2008 |

OTHER PUBLICATIONS

Office Action dated Feb. 5, 2013 in the corresponding JP Application No. 2009-066505 with English translation thereof.

Office action dated Apr. 1, 2014 in corresponding Japanese Application No. 2013-091485.

Office Action issued Feb. 24, 2015 in corresponding Japanese Divisional Application No. 2013-091485 (with English translation).

* cited by examiner

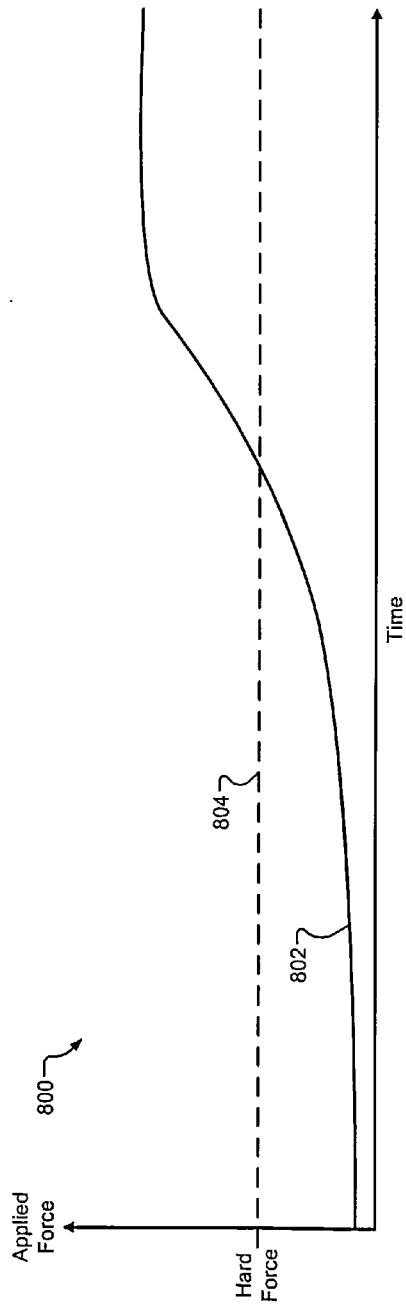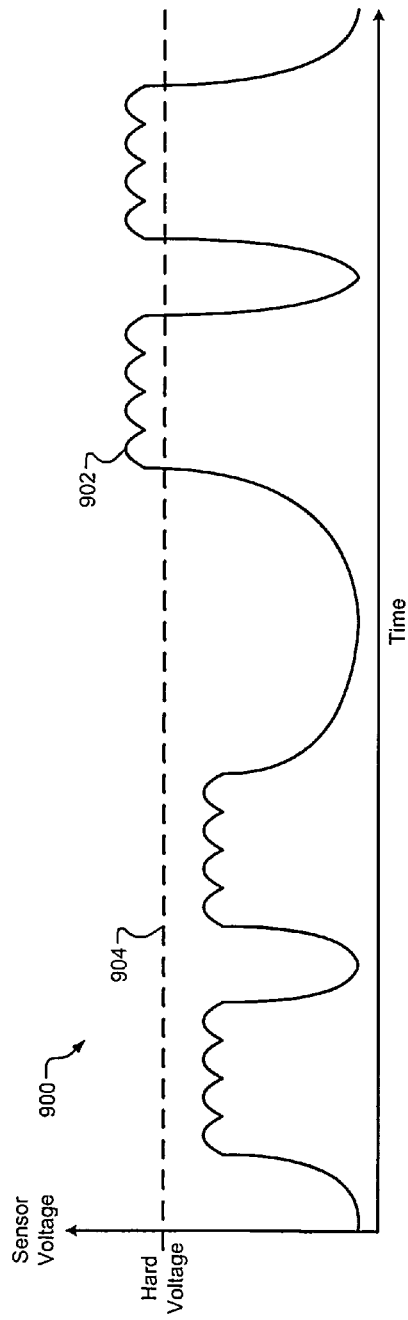

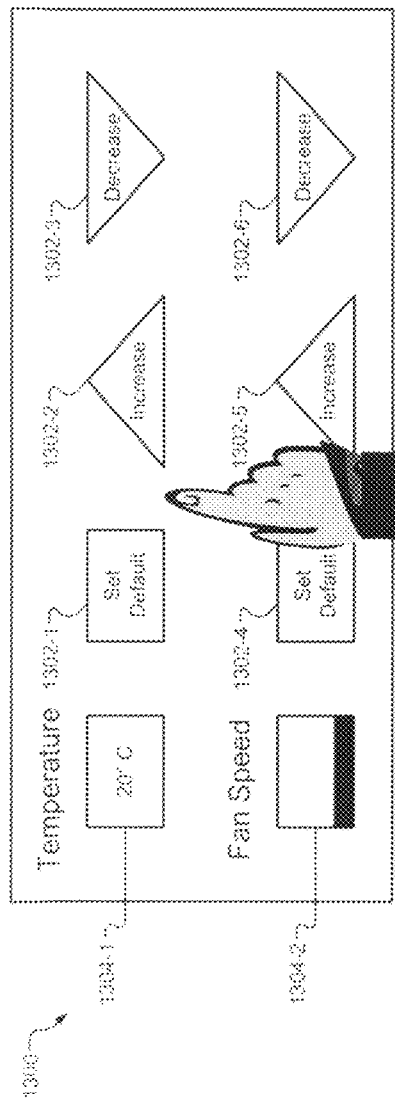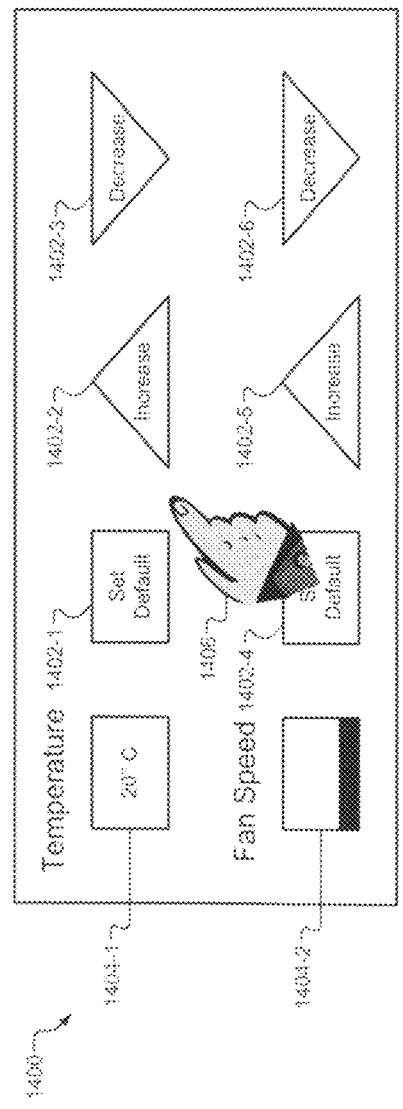

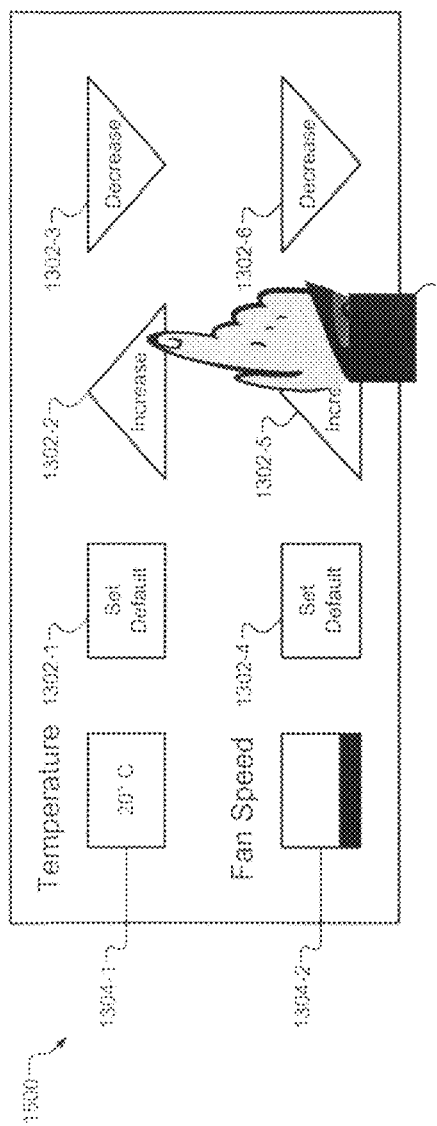
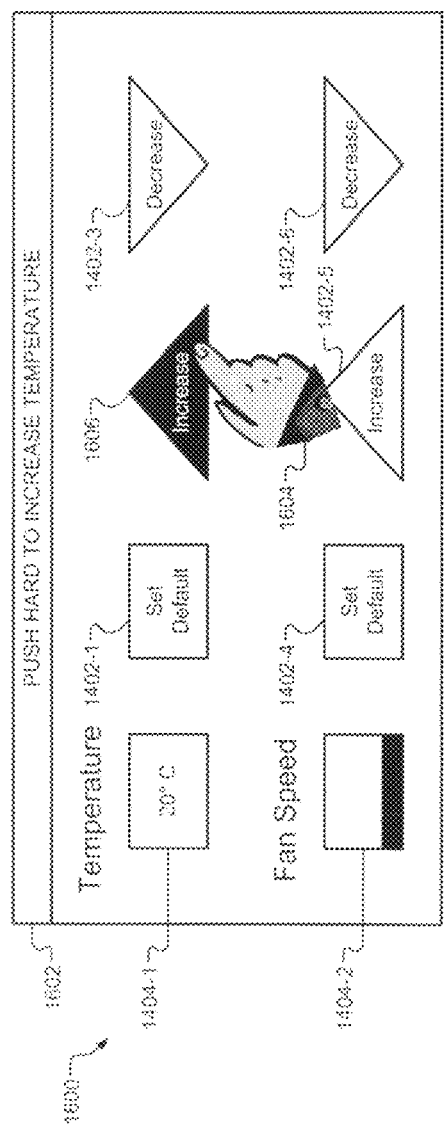
FIG. 12A
FIG. 12B

HAPTIC TRACKING REMOTE CONTROL FOR DRIVER INFORMATION CENTER SYSTEM

FIELD

The present disclosure relates to human machine interfaces and, more particularly, to an improved control interface for a driver of a vehicle.

BACKGROUND

The statements in this section merely provide background information related to the present disclosure and may not constitute prior art. Indicating instruments or gauges for viewing by drivers of vehicles generally include an analog portion for displaying and/or controlling vehicle operating conditions, such as the temperature of the interior cabin of a vehicle. In more recent vehicles, indicating instruments generally include a liquid crystal display (LCD) for displaying and/or controlling the vehicle operating conditions. An analog device typically includes a faceplate having indicia adjacent a scale to denote levels of the scale and a pointer for rotating to the indicia and scale numbers, such as mile per hour markings. While such analog and LCD devices have generally proven satisfactory for their intended purposes, they have been associated with their share of limitations.

One such limitation of current vehicles with analog and/or LCD devices relates to their safety. Because such analog and LCD devices are normally located in separate, side-by-side locations on a dash of a vehicle, a driver of the vehicle may have to remove his or her hands a far distance from a steering wheel of the vehicle to reach and adjust vehicle operating conditions. While adjusting the vehicle operating conditions on the analog and LCD devices, the driver may not be ready to make a sudden, emergency turn, for example.

Another limitation of current vehicles employing analog and/or LCD devices is related to their accuracy of use. To avoid accidents, the driver has to preferably adjust vehicle operating conditions on the analog and LCD devices while keeping his or her eyes on the road. Without being able to look at the analog and LCD devices, the driver may incorrectly adjust the vehicle operating conditions.

What is needed then is a device that does not suffer from the above disadvantages. This, in turn, will provide an LCD device that is safe for the driver to control. In addition, the LCD device should lead to accurate use even without having to see the LCD device.

SUMMARY

A control interface system for a driver of a vehicle comprises a touchscreen, a control module, and a display. The touchscreen is located proximate to the driver of the vehicle and upon driver interaction therewith is operable to generate a sensor signal. The control module is adapted to receive the sensor signal from the touchscreen and is operable to initiate control of a vehicle function and to generate a haptic feedback signal in response thereto. The touchscreen is adapted to receive the haptic feedback signal from the control module and is operable to provide haptic feedback to the driver of the vehicle in response thereto. The display is embedded in an instrument panel of the vehicle and provides an indicia of the vehicle function controlled by the touchscreen and of driver interaction therewith.

In other features, the control module is in data communication with the display and operable to initiate control of the vehicle function as indicated on the display. The touchscreen includes at least one control icon upon driver interaction therewith operable to generate the sensor signal. The display provides an indicia of the control icon currently selectable via the touchscreen.

In still other features, the control module determines an applied force on the touchscreen based on the sensor signal. The control module generates the haptic feedback signal when the applied force is applied to the control icon. The display provides an indicia of the control icon currently selected via the touchscreen.

In other features, the control module initiates control of the vehicle function when the applied force is applied to the control icon, removed from the control icon, and reapplied to the control icon within a predetermined time. The control module generates the haptic feedback signal. The display provides an indicia of the control icon currently executed via the touchscreen.

In still other features, the control module initiates control of the vehicle function when the applied force is applied to the control icon and is greater than a predetermined value. The control module generates the haptic feedback signal. The display provides an indicia of the control icon currently executed via the touchscreen.

In other features, the touchscreen includes at least one imbedded switch operable to generate the sensor signal upon actuation thereof. The touchscreen includes at least one imbedded piezo device operable to generate the sensor signal upon driver interaction therewith, adapted to receive the haptic feedback signal from the control module, and operable to provide haptic feedback to the driver of the vehicle in response thereto.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 9A is a graph depicting a applied force over a time for a piezo sensor of the input module interface of FIG. 8;

FIG. 9B is a graph depicting a sensor voltage over a time for the piezo sensor of FIG. 8;

FIG. 11A is a screenshot illustrating an input module of the RHM of FIG. 2 when the mode is a search mode in accordance with an embodiment of the present invention;

FIG. 11B is a screenshot illustrating a display of the DIC module of FIG. 2 when the mode is the search mode in accordance with an embodiment of the present invention;

FIG. 12A is a screenshot illustrating the input module of FIG. 2 when the mode is a select mode;

FIG. 12B is a screenshot illustrating the display of FIG. 2 when the mode is the select mode;

DETAILED DESCRIPTION

Figure 1:
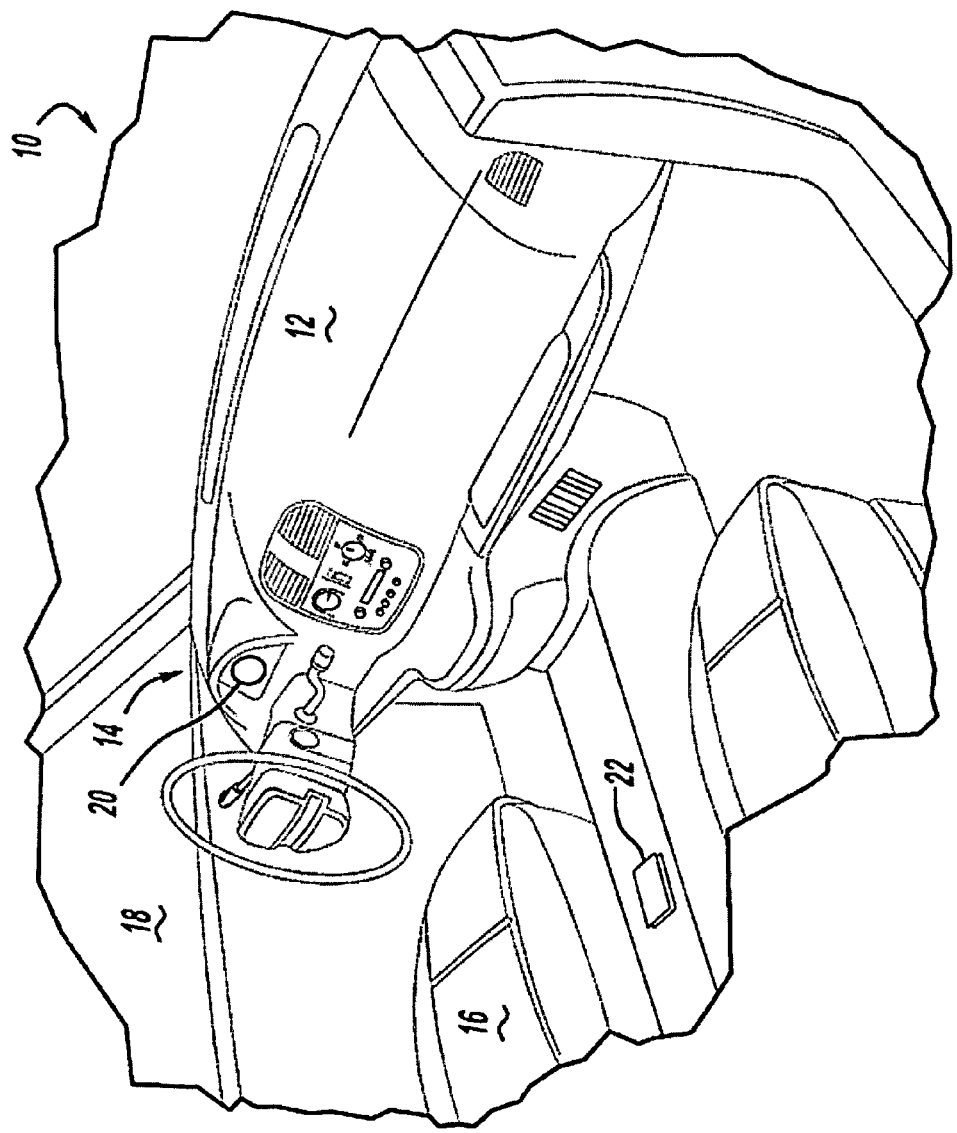
FIG. 1 is a perspective view of an interior cabin of a vehicle depicting a location of a display information center (DIC) and a haptic tracking remote.

The following description is merely exemplary in nature and is not intended to limit the present disclosure, application, or uses. It should be understood that throughout the drawings, corresponding reference numerals indicate like or corresponding parts and features. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Turning now to FIGS. 1-13, the teachings of the present invention will be explained. With initial reference to FIG. 1, depicted is a vehicle 10 having a dash 12 and an instrument panel 14, both of which may be situated in front of a driver's seat 16 in an interior cabin 18 of the vehicle 10. As part of the instrument panel 14, a display information center (DIC) 20 is depicted and may be exemplified by an indicating instrument or gauge, such as, but not limited to, a thermometer for the interior cabin 18. The DIC 20 is connected to a haptic tracking remote 22 that controls the DIC 20 as described herein.

Figure 2:
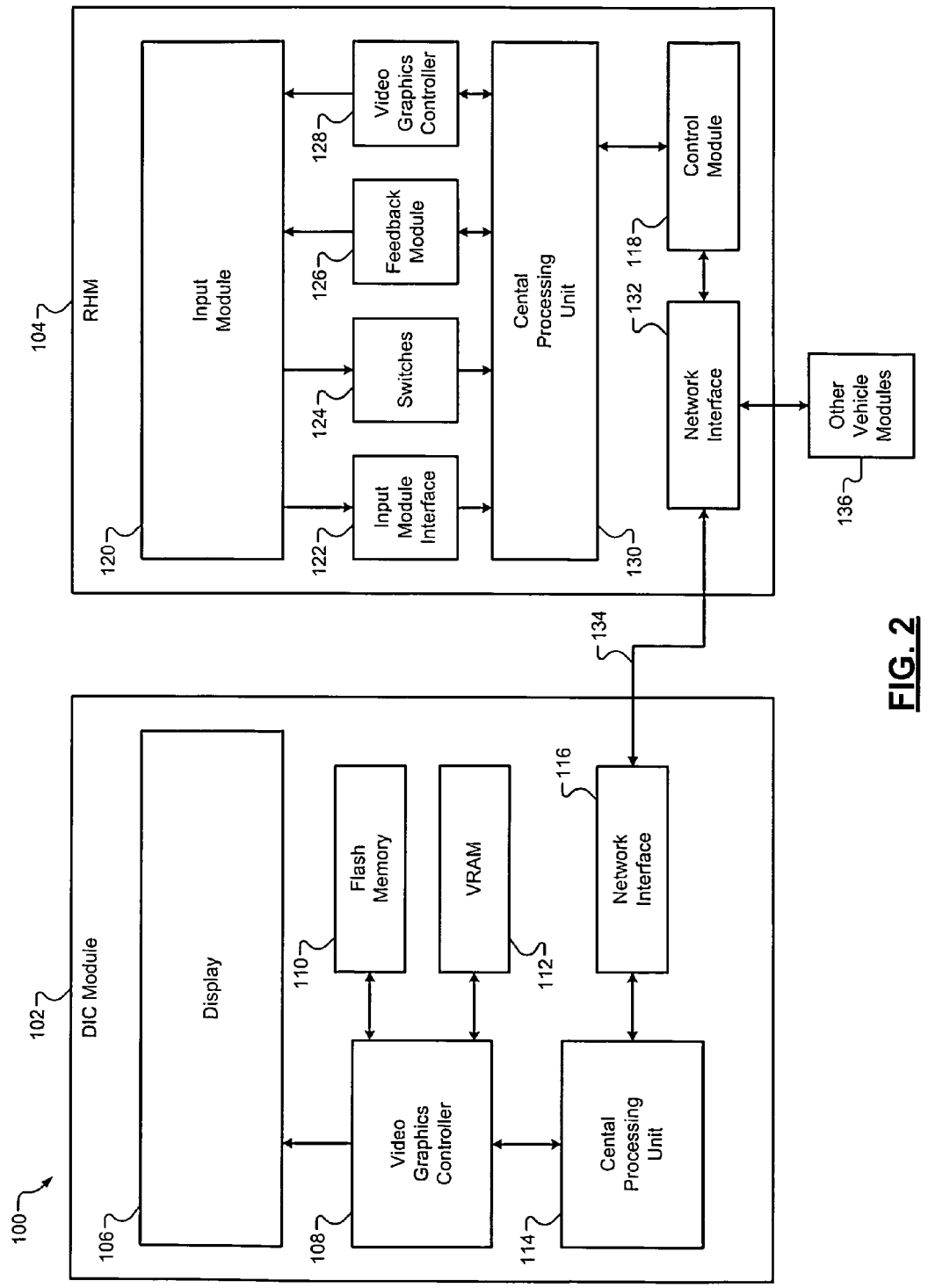
FIG. 2 is a functional block diagram of a control interface system that includes a DIC module of the DIC of FIG. 1 and a remote haptic module (RHM) of the haptic tracking remote of FIG. 1 in accordance with an embodiment of the present invention.

Turning now to FIG. 2, an exemplary control interface system 100 is shown. The control interface system 100 includes a DIC module 102 of the DIC 20 and a remote haptic module (RHM) 104 of the haptic tracking remote 22. The DIC module 102 includes a display 106, a video graphics controller 108, a flash memory 110, a video random access memory (VRAM) 112, a central processing unit 114, and a network interface 116. The RHM 104 includes an input module 120, an input module interface 122, switches 124, a feedback module 126, a video graphics controller 128, a central processing unit 130, a control module 118, and a network interface 132. In other embodiments of the present invention, the control module 118 may be located in only the DIC module 102, or in both the DIC module 102 and the RHM 104.

The input module 120 may be, but is not limited to, a touchpad or a touchscreen. For example only, the touchscreen may be a thin film transistor liquid crystal display. The input module 120 includes at least one control icon centered at coordinates (i.e., control icon coordinates) on the surface of the input module 120. A driver of the vehicle 10 touches the control icon to control the DIC module 102. The input module 120 further includes at least one value of the instrument panel 14 (i.e., a control value).

The control icon's data and image may be predetermined and may reside in the flash memory 110 and be downloaded to the RHM 104, or vice versa (not shown). For example only, the control icon's image may be in one of different geometric shapes. In addition, the control icon's image (i.e., shape and color) may be customized by the driver via a graphical user interface.

For example only, several control icon images may be predetermined and selected by the driver. Alternatively, the control icon images may be created by the driver on a web site and downloaded to the RHM 104 or the DIC module 102. The driver's image settings may be stored in local memory (not shown).

If the driver wants to execute a command of the control icon, the driver may do any of the following three options (individual or combined). For example only, the command may be to set, increase, or decrease a value of the instrument panel 14, such as a temperature of the interior cabin 18. One, the driver may touch the control icon with an applied force, remove his or her touch, and touch the control icon again within a predetermined time (i.e., perform an "OFF-ON sequence"). Two, the driver may touch the control icon with an applied force that is greater than a predetermined value (i.e., a hard force). Three, the driver may activate a voice recognition module (not shown) and voice the command.

The input module interface 122 detects the applied force, a location of the applied force on the surface of the input module 120 (i.e., an applied force location), and voice commands of the driver. To detect the applied force, the input module interface 122 may include a piezo device, a standard force/displacement gauge, a hall-effect switch, and/or a shock detection accelerometer transducer. To detect the voice commands, the input module interface 122 may include the voice recognition module. The input module interface 122 generates a sensor signal based on the detected applied force, the detected applied force location, and/or the detected voice commands. The central processing unit 130 receives the sensor signal and processes the sensor signal.

The switches 124 may be used to detect the applied force that is greater than the hard force. The switches 124 include mechanical switches. When the applied force is greater than the hard force, the input module 120 moves completely to toggle the mechanical switches. When toggled, the mechanical switches connect or disconnect a circuit between a voltage source (not shown) and the central processing unit 130. The voltage source may be located within the input module 120 and generates a sensor signal that indicates that the applied force is greater than the hard force. When the circuit is connected, the central processing unit 130 receives the sensor signal that indicates that the applied force is greater than the hard force.

The video graphics controller 128 may generate and output images of the control icon, the control value, other data of the vehicle 10, and/or a graphical user interface to the input module 120. The images may be predetermined and may reside in the flash memory 110 and be downloaded to the RHM 104, or vice versa (not shown). In addition, the images may be customized by the driver via the graphical user interface. The driver's image settings may be stored in local memory.

For example only, the display 106 may be a thin film transistor liquid crystal display. The display 106 includes at least one display icon centered at coordinates (i.e., display icon coordinates) on the surface of the display 106 and at least one value of the instrument panel 14 (i.e., a display value). The display icon's data and image may be predetermined and may reside in the flash memory 110 and be downloaded to the RHM 104, or vice versa (not shown). For example only, the display icon's image may be in one of different geometric shapes.

In addition, the display icon's image may be customized by the driver via a graphical user interface. For example only, several display icon images may be predetermined and selected by the driver. Alternatively, the display icon images may be created on a web site and downloaded to the DIC module 102 or the RHM 104. The driver's image settings may be stored in local memory.

The surface of the input module 120 is mapped onto the surface of the display 106. In other words, the surface of the display 106 is a virtual image of the surface of the input module 120. The surface of the input module 120 may have to be scaled in order to be mapped onto the surface of the display 106. An amount of horizontal pixels of the surface of the display 106 H may be determined according to the following equation:

$$H=h*s, \qquad (1)$$

where h is an amount of horizontal pixels of the surface of the input module 120 and s is a horizontal scale factor. An amount of vertical pixels of the surface of the display 106 V may be determined according to the following equation:

$$V=v*t, \qquad (2)$$

where v is an amount of vertical pixels of the surface of the input module 120 and t is a vertical scale factor.

The control icon is mapped into the display icon. The control icon coordinates may have to be scaled in order to be mapped into the display icon. The video graphics controller 108 and the VRAM 112 generate and output images of the display icon, the display value, other data of the vehicle 10, and/or the graphical user interface to the display 106.

The images may be predetermined and may reside in the flash memory 110 and be downloaded to the RHM 104, or vice versa (not shown). In addition, the images may be customized by the driver via the graphical user interface. The driver's image settings may be stored in local memory.

The control module 118 receives the processed sensor signal from the central processing unit 130 and determines the applied force based on the processed sensor signal. The control module 118 determines whether the applied force is greater than a minimum force. The minimum force is less than the hard force and a predetermined value. If the applied force is greater than the minimum force, the control module 118 sets a mode of the control interface system 100 to a search mode.

The control module 118 sets a display signal to an initial signal that commands the DIC module 102 and the RHM 104 to display the images of the display and the control icons, the display and the control values, and the graphical user interface. The network interface 132 receives the display signal and transfers the display signal to the network interface 116 via a network bus 134. For example only, the network interfaces 116 and 132 and the network bus 134 may be parts of a Controller Area Network, a Local Interconnect Network, and/or a wireless network.

The central processing unit 114 receives and processes the display signal from the network interface 116. The video graphics controller 108 and the VRAM 112 receive the processed display signal and generate and output the images of the display icons and the display values to the display 106. The central processing unit 130 receives and processes the display signal from the control module 118. The video graphics controller 128 receives the processed display signal and generates and outputs the images of the control icons and the control values to the input module 120.

The control module 118 determines coordinates of the driver's touch on the surface of the input module 120 (i.e., touch coordinates) based on the processed sensor signal. The control module 118 determines an area of the driver's touch centered at the touch coordinates (i.e., a touch area). The control module 118 determines an area of the driver's touch on the surface of the display 106 (i.e., a virtual touch area) centered at coordinates on the surface of the display 106 (i.e., virtual touch coordinates). The control module 118 determines the virtual touch area based on mapping the touch area into the virtual touch area. For example only, the image of the virtual touch area may be of, but is not limited to, a pointer or a finger on the display 106.

The control module 118 determines the display signal based on the mode and the virtual touch area. When the mode is the search mode, the display signal commands the DIC module 102 to display the image of the virtual touch area along with the images of the display icons, the display values, and the graphical user interface. In other words, the driver's touch on the surface of the input module 120 is tracked, or indicated, on the display 106.

The control module 118 may determine whether the touch coordinates are above the control icon. Alternatively, in another embodiment of the present invention, the control module 118 may determine whether the virtual touch coordinates are above the display icon. If the touch coordinates are above the control icon, or if the virtual touch coordinates are above the display icon, the control module 118 sets the mode to a selection mode.

The control module 118 determines a feedback signal based on the mode and the touch coordinates to provide feedback to the driver to indicate that the control icon has been touched with at least the minimum force. For example only, the intensity of the feedback may change depending on the mode and the control icon the driver touches. The central processing unit 130 receives and processes the feedback signal. The feedback module 126 receives the processed feedback signal.

The feedback module 126 may include a haptic actuator module or a piezo device that provides haptic feedback, such as a haptic vibration, to the driver when the feedback module 126 receives the processed feedback signal. The feedback module 126 may include an audio module (not shown) that provides audio feedback, such as audio of the command of the control icon, to the driver when the feedback module 126 receives the processed feedback signal. The feedback module 126 may provide both haptic and audio feedback at the same time. In addition, the driver may select whether he or she wants haptic feedback, audio feedback, both haptic and audio feedback, or no feedback. The driver's feedback settings may be stored in local memory and/or downloaded to the DIC module 102.

The control module 118 determines the display signal based on the mode, the touch coordinates, and the virtual touch area to change the virtual image to indicate to the driver that the control icon has been touched with at least the minimum force. For example only, the images of the selected display icon and/or the virtual touch area may change in color and/or animation depending on the mode and the control icon the driver touches. When the mode is the select mode, the display signal commands the DIC module 102 to display the changed images of the selected display icon and/or the virtual touch area along with images of any other display icons, the display values, and the graphical user interface.

The control module 118 determines whether the driver executes the command of the control icon based on the processed sensor signal. If the driver executes the command, the control module 118 sets the mode to an execute mode. The control module 118 starts a timing module (not shown). The timing module may be located within the control module 118 or at other locations, such as within the RHM 104, for example.

The timing module includes a timer that begins to increment when the timing module is started. The timing module determines a timer value based on the timer. The control module 118 determines a command signal based on the touch coordinates to execute the command of the control icon.

The amount of times the command is executed is determined based on the timer value. Other vehicle modules 136, such as for example a temperature control module (not shown), receive the command signal from the control module 118 via the network interface 132. The other vehicle modules 136 act accordingly to execute the command of the control icon.

The control module 118 determines the feedback signal based on the mode and the command signal to change the feedback to the driver to indicate that the command of the control icon has been executed. The control module 118 determines the display signal based on the mode, the virtual touch area, and the command signal. The control module 118 changes the images of the executed display icon, the virtual touch area, and/or the corresponding display and the control values to indicate to the driver that the command has been executed.

The display and the control values change depending on the control icon the driver touches. When the mode is the execute mode, the display signal commands the DIC module 102 to display the changed images of the executed display icon, the virtual touch area, and the corresponding display value along with images of any other display icons and display values. In addition, the display signal commands the RHM 104 to display the image of the changed control value along with images of the control icons and any other control values.

The control module 118 determines whether the driver continues to execute the command of the control icon based on the updated processed sensor signal. If the driver continues to execute the command, the control module 118 receives the timer value from the timing module. The control module 118 determines a predetermined maximum period for the command to execute (i.e., a maximum command period). The control module 118 determines whether the timer value is less than the maximum command period.

If the timer value is less than the maximum command period, the control module 118 continues to determine the command signal, the feedback signal, and the display signal. If the timer value is greater than or equal to the maximum command period, the control module 118 resets the timing module and sets the display to a final signal. The final signal commands the DIC module 102 to display the display icons and the display values and commands the RHM 104 to display the control icons and the control values.

The control module 118 receives the timer value. The control module 118 determines whether the timer value is greater than a predetermined period for the DIC module 102 to display the display icons and for the RHM 104 to display the control icons (i.e., a maximum display period). If the timer value is less than the maximum display period, the control module 118 continues to set the display signal to the final signal. If the timer is greater than the maximum display period, the control module 118 sets the display signal to a standby signal. The standby signal may command the DIC module 102 to display only the display values and/or command the RHM 104 to display only the control values.

Figure 3:
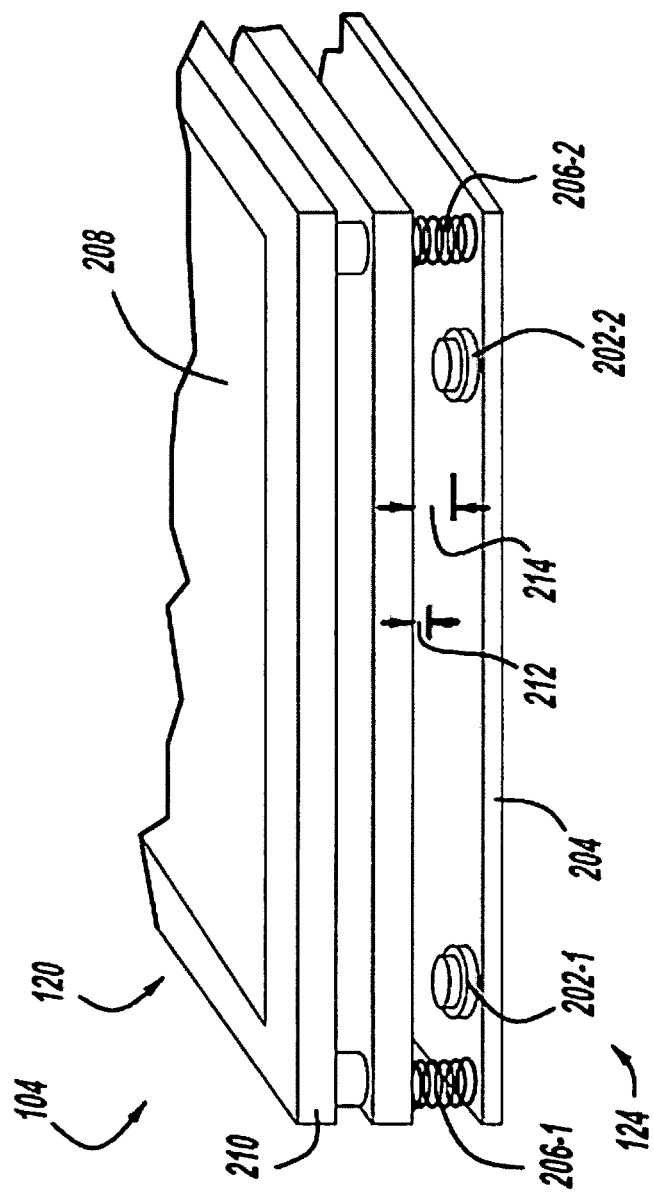
FIG. 3 is a perspective view of an embodiment of the RHM of FIG. 2.

Turning now to FIG. 3, an embodiment of the RHM 104 and associated structure is shown. The switches 124 include mechanical switches 202-1, 202-2 (referred to collectively as mechanical switches 202). The mechanical switches 202 may be pushbuttons.

The RHM 104 includes a hard frame 204 that may be a printed circuit board. The mechanical switches 202 are placed on the hard frame 204. The RHM 104 includes springs 206-1, 206-2 (referred to collectively as springs 206) that are placed between the hard frame 204 and the input module 120. When uncompressed, the springs 206 prevent the input module 120 from touching the mechanical switches 202. The input module 120 includes a touchscreen 208 that is placed within a support structure 210. The support structure 210 may be used to provide the haptic feedback to the driver.

When the driver touches the input module 120 with an applied force that is less than or equal to the hard force, the input module 120 moves a displacement 212 toward the mechanical switches 202. When moved the displacement 212, the input module compresses the springs 206. When the driver touches the input module 120 with an applied force that is greater than the hard force, the input module 120 moves a displacement 214 that is greater than the displacement 212 toward the mechanical switches 202. When moved the displacement 214, the input module 120 compresses further the springs 206 and toggles the mechanical switches 202 to indicate that the applied force is greater than the hard force.

Figure 4:
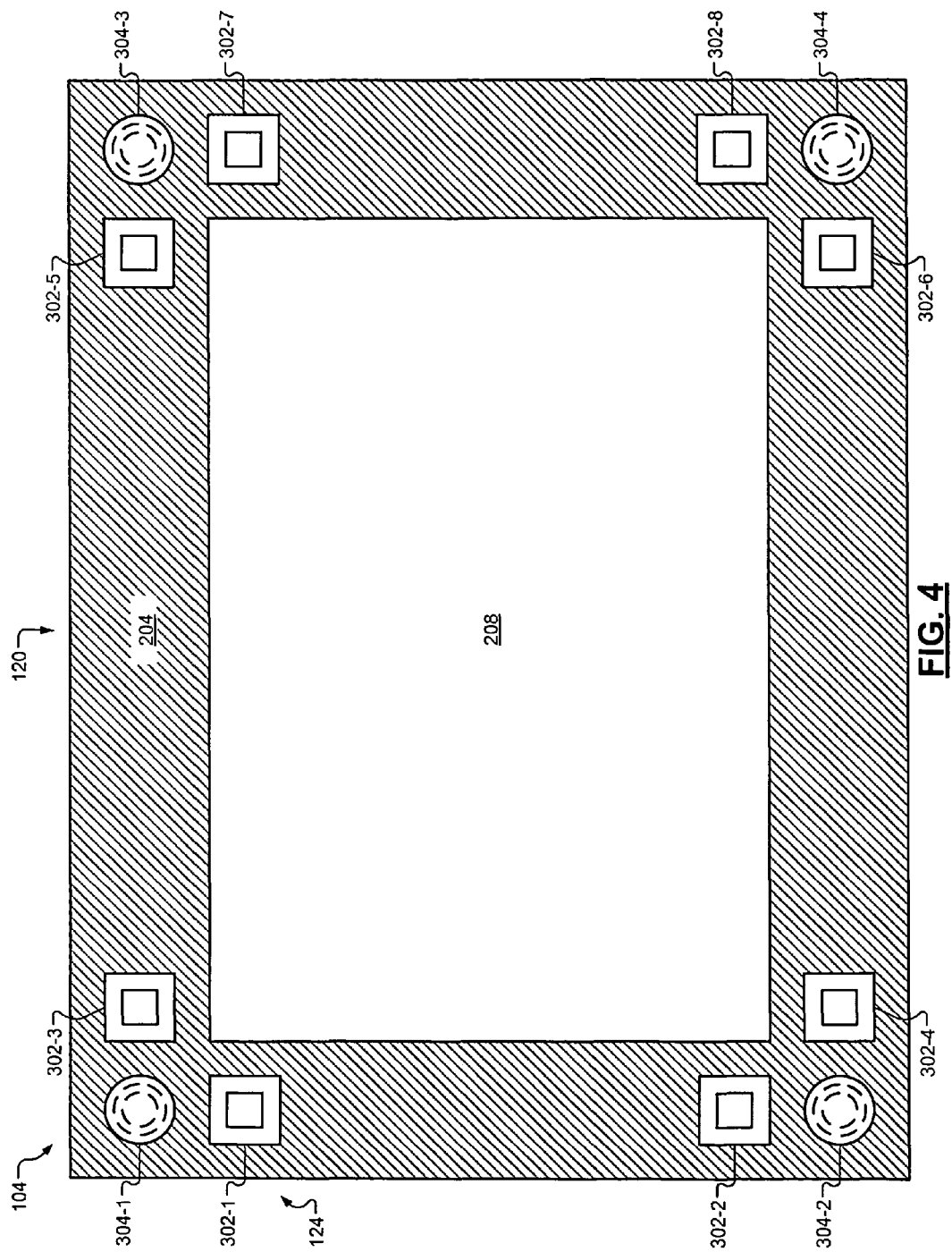
FIG. 4 is a top view of the RHM of FIG. 3.

Continuing with FIG. 4, a top view of the RHM 104 and the associate structure is shown. The switches 124 include mechanical switches 302-1, 302-2, 302-3, 302-4, 302-5, 302-6, 302-7, 302-8 (referred to collectively as mechanical switches 302). The mechanical switches 302 may be pushbuttons.

The mechanical switches 302 are placed on the hard frame 204. The RHM 104 includes springs 304-1, 304-2, 304-3, 304-4 (referred to collectively as springs 304). The springs 304 are placed between the hard frame 204 and the input module 120. When uncompressed, the springs 304 prevent the input module 120 from touching the mechanical switches 302. The input module 120 includes the touchscreen 208.

Figure 5:
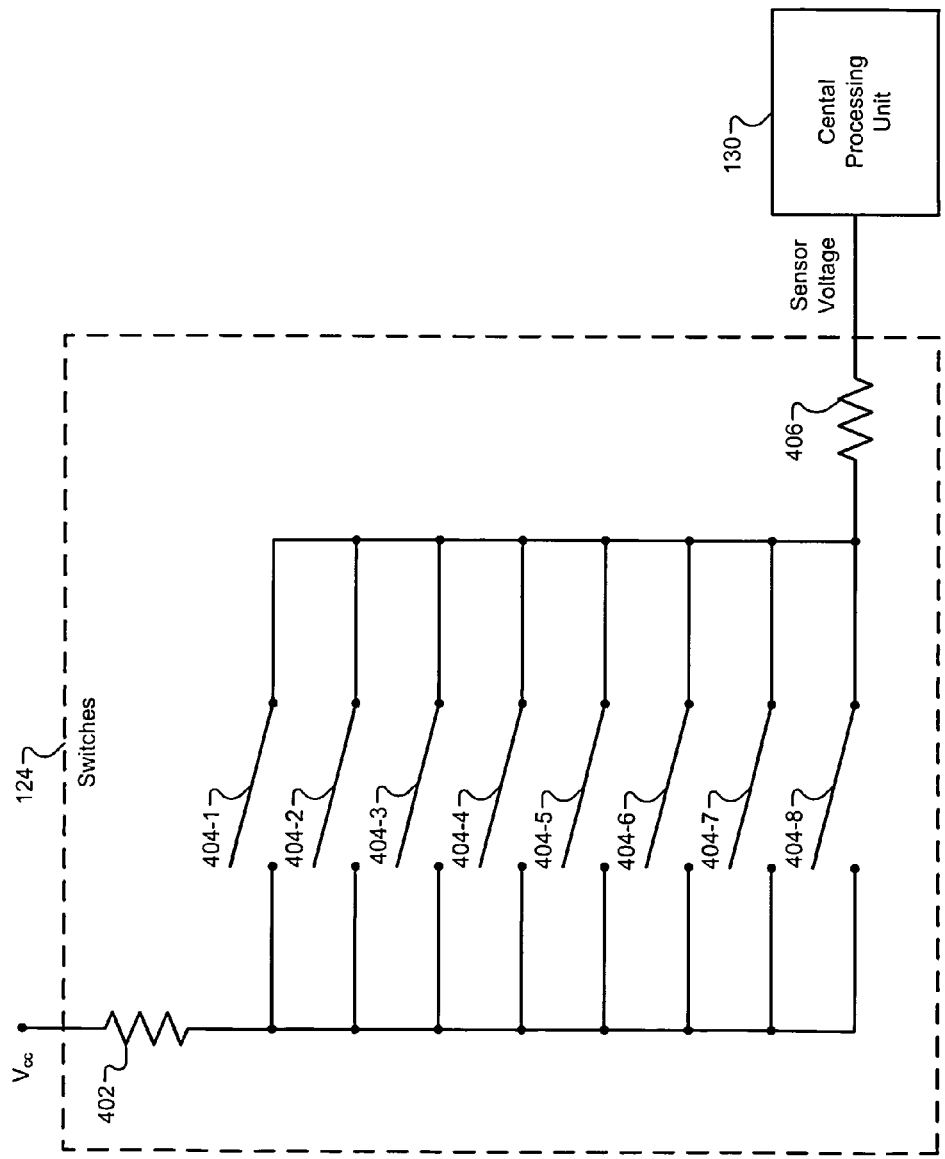
FIG. 5 is a functional block diagram of an embodiment of switches of the RHM of FIG. 3.

Continuing with FIG. 5, an exemplary functional block diagram of the switches 124 is shown. The switches 124 include a resistor 402 that receives and drops a positive supply voltage ($V_{cc}$). The positive supply voltage may be from, but is not limited to being from, the input module 120.

The switches 124 further include electrical switches 404-1, 404-2, 404-3, 404-4, 404-5, 404-6, 404-7, 404-8 (referred to collectively as electrical switches 404) and a resistor 406. When toggled, the electrical switches 404 connect or disconnect the circuit between the resistor 402 and the resistors 406. The electrical switches 404 are in an "or" configuration, so any one of the electrical switches 404 may be toggled to connect a circuit between the resistor 402 and the resistor 406. If the circuit is connected, the resistor 406 receives and drops further the positive supply voltage. The central processing unit 130 of the RHM 104 receives the dropped positive supply voltage as the sensor signal that indicates that the applied force is greater than the hard force.

Figure 6:
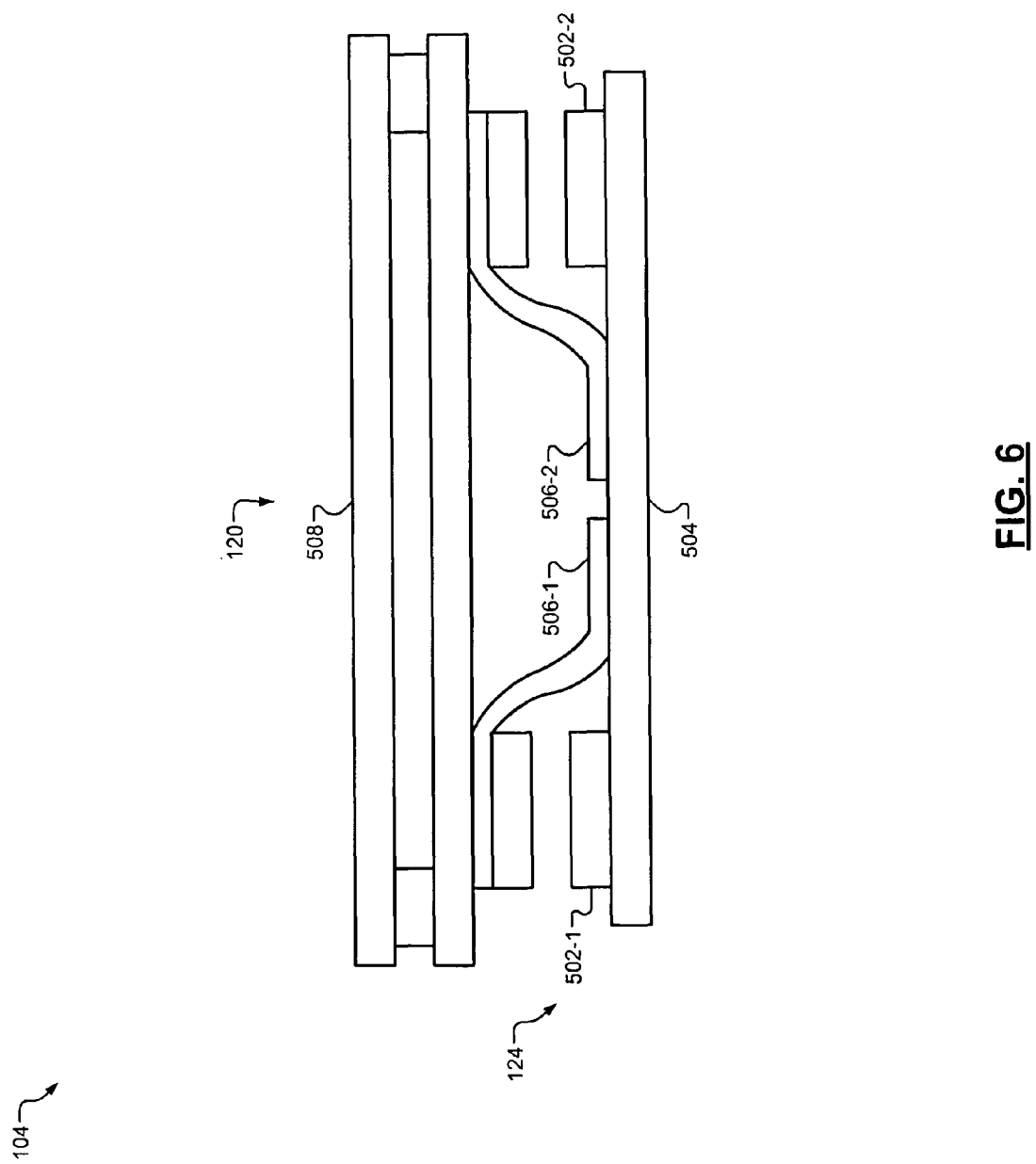
FIG. 6 is a side view of an embodiment of the RHM of FIG. 2.

Turning now to FIG. 6, another embodiment of the RHM 104 and associated structure is shown. The switches 124 include contacts 502-1, 502-2 (referred to collectively as contacts 502). The RHM 104 includes a hard frame 504 that may be a printed circuit board. The contacts 502 are placed on the hard frame 504.

The switches 124 further include spring blades 506-1, 506-2 (referred to collectively as spring blades 506) that are welded or soldered onto the hard frame 504. The spring blades 506 are placed between the hard frame 504 and the input module 120. The spring blades 506 may also be welded or soldered onto the bottom surface of the input module 120. When uncompressed, the spring blades 506 prevent the input module 120 from touching the contacts 502.

The input module 120 includes a support structure 508 that may be used to provide the haptic feedback to the driver. When the applied force is greater than the hard force, the input module 120 moves toward the contacts 502 and compresses the spring blades 506. The input module 120 causes the spring blades 506 to touch the contacts 502. When touched, the contacts 502 connect a circuit between the input module 120 and the central processing unit 130 of the RHM 104. When connected, the input module 120 outputs the sensor signal that indicates that the applied force is greater than the hard force to the central processing unit 130.

Figure 7:
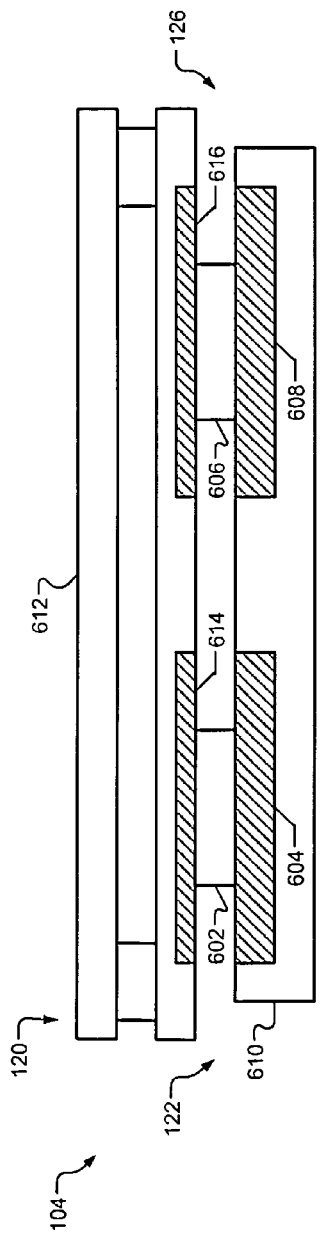
FIG. 7 is a side view of an embodiment of the RHM of FIG. 2.

Turning now to FIG. 7, another embodiment of the RHM 104 and associated structure is shown. The input module interface 122 includes a piezo device (i.e., a piezo sensor 602) and copper traces 604. The feedback module 126 includes a piezo device (i.e., a piezo actuator 606) and copper traces 608. Alternatively, in another embodiment of the present invention, the RHM 104 may include a piezo device (i.e., a piezo transducer) that acts as both the piezo sensor 602 and the piezo actuator 606.

The copper traces 604, 608 are placed on the surface of a hard frame 610. The piezo sensor 602 is placed on top of the copper traces 604, while the piezo actuator 606 is placed on top of the copper traces 608. The input module 120 is placed on top of the piezo sensor 602 and the piezo actuator 606. The input module 120 includes a supporting structure 612 that may be used by the feedback module 126 to provide the haptic feedback to the driver. The supporting structure 612 includes indium tin oxide (ITO) traces 614 and ITO traces 616 that electrically and mechanically connect the piezo sensor 602 and the piezo actuator 606, respectively, to the supporting structure 612.

When the driver touches the input module 120 with the applied force, the piezo sensor 602 receives the applied force via the ITO traces 614 and the copper traces 604. The piezo sensor 602 generates a sensor voltage signal based on the applied force. The ITO traces 614 and the copper traces 604 receive the sensor voltage signal for use by the control interface system 100. For example only, the input module interface 122 may determine the sensor signal based on the sensor voltage signal.

To provide the haptic feedback to the driver via the piezo actuator 606, the control interface system 100 determines an actuator voltage signal. For example only, the feedback module 126 may determine the actuator voltage signal based on the feedback signal from the control module 118. The piezo actuator 606 receives the actuator voltage signal via the ITO traces 616 and the copper traces 608. The piezo actuator 606 produces an actuator force based on the actuator voltage signal and outputs the actuator force through the ITO traces 616 and the copper traces 608. The actuator force via the supporting structure 612 provides the haptic feedback to the driver.

Figure 8:
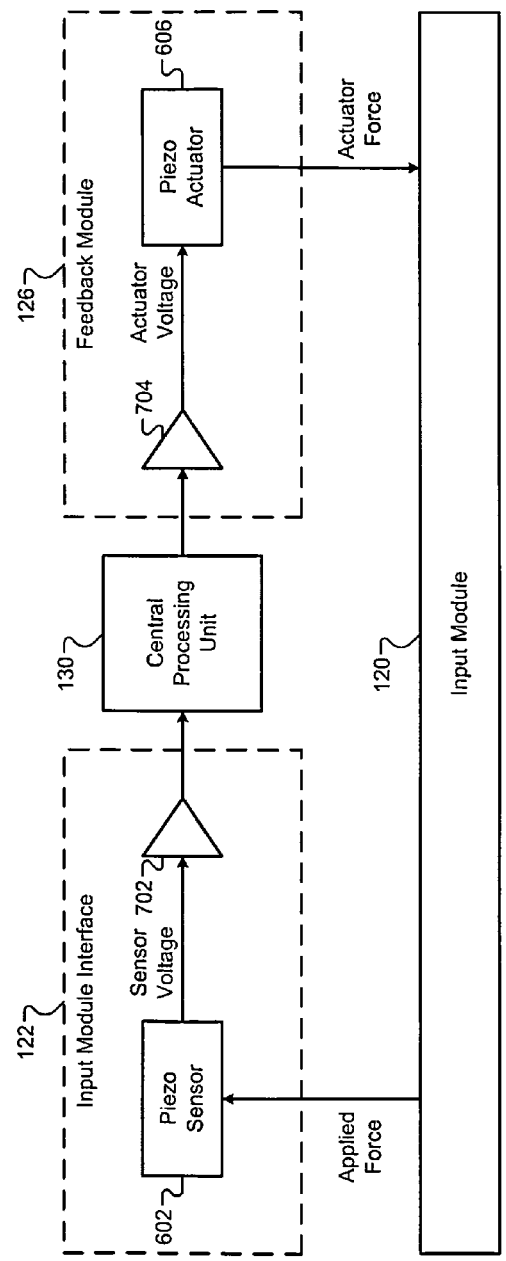
FIG. 8 is a functional block diagram of an embodiment of a input module interface and a feedback module of the RHM of FIG. 7.

Continuing with FIG. 8, an exemplary functional block diagram of the input module interface 122 and the feedback module 126 of the RHM 104 is shown. The input module interface 122 includes a piezo sensor 602 and an amplifier 702. The feedback module 126 includes an amplifier 704 and a piezo actuator 606. Alternatively, in another embodiment of the present invention, the RHM 104 may include a piezo transducer that acts as both the piezo sensor 602 and the piezo actuator 606.

The piezo sensor 602 receives the applied force from the input module 120 and determines the sensor voltage signal based on the applied force. The amplifier 702 receives the sensor voltage signal and amplifies the sensor voltage signal. The central processing unit 130 receives the amplified sensor voltage signal for use by the control interface system 100.

The central processing unit 130 generates the actuator voltage signal. The amplifier 704 receives the actuator voltage signal and amplifies the actuator voltage signal. The piezo actuator 606 receives the amplified actuator voltage signal and produces the actuator force based on the actuator voltage signal. The input module 120 receives the actuator force and is displaced by the actuator force. A change in actuator force $\Delta F_a$ may be determined according to the following equation:

$$\Delta F_a = k * \Delta L, \qquad (3)$$

where $k$ is a predetermined displacement constant and $\Delta L$ is a displacement of the input module 120.

Continuing with FIG. 9A, a graph 800 depicts an applied force 802 versus a time for the piezo sensor 602. The applied force 802 is initially a value below a hard force 804. The applied force 802 increases to a value greater than the hard force 804.

Continuing with FIG. 9B, a graph 900 depicts a sensor voltage 902 versus a time for the piezo sensor 602. The graph 900 is correlated to the graph 800. The sensor voltage 902 is initially a value below a voltage value that is correlated to the hard force 804 (a hard voltage 904). When the applied force 802 increases to a value greater than the hard force 804, the sensor voltage 902 increases to a value greater than the hard voltage 904. The sensor voltage 902 may be sampled and/or filtered to reduce the noise of the sensor voltage 902 and convert the alternating current signal to a direct current signal.

Figure 9C:
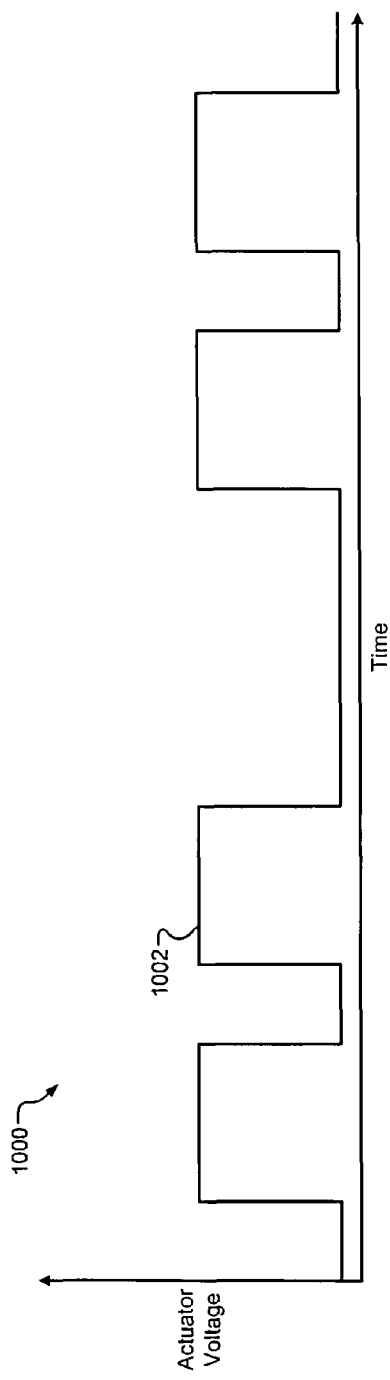
FIG. 9C is a graph depicting an actuator voltage over a time for a piezo actuator of the feedback module of FIG. 8.

Continuing with FIG. 9C, a graph 1000 depicts an actuator voltage 1002 versus a time for the piezo actuator 606. Each pulse of the actuator voltage 1002 is a command from the control interface system 100 for the piezo actuator 606 to provide the haptic feedback to the driver. The value of the actuator voltage 1002 when the applied force is less than or equal to the hard force may be different than the value when the applied force is greater than the hard force (not shown).

Figure 9D:
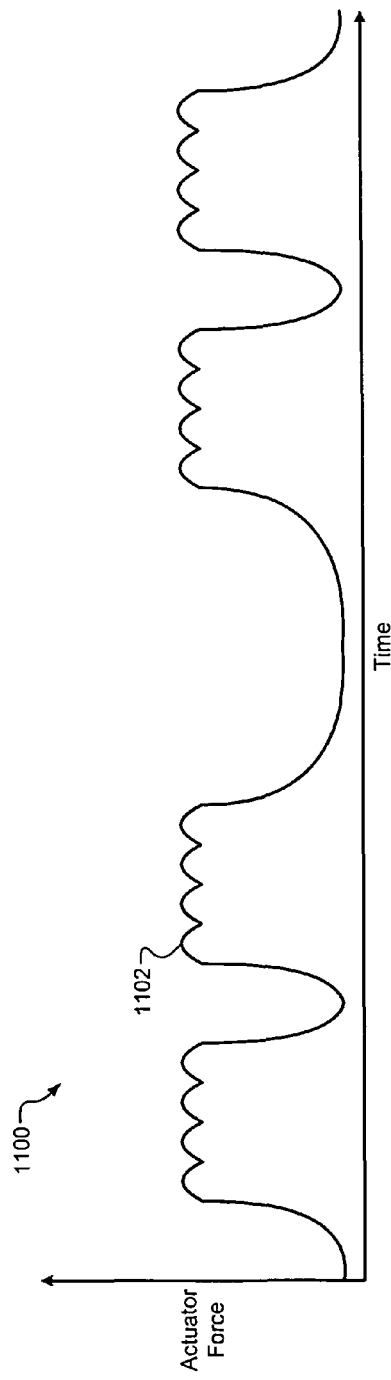
FIG. 9D is a graph depicting an actuator force over a time for the piezo actuator of FIG. 8.

Continuing with FIG. 9D, a graph 1100 depicts an actuator force 1102 versus a time for the piezo actuator 606. The graph 1100 is correlated to the graph 1000. When the actuator voltage 1002 pulses (i.e., increases), the actuator force 1102 pulses. The value of the actuator force 1102 when the applied force is less than or equal to the hard force may be different than the value when the applied force is greater than the hard force (not shown).

Figure 10A:
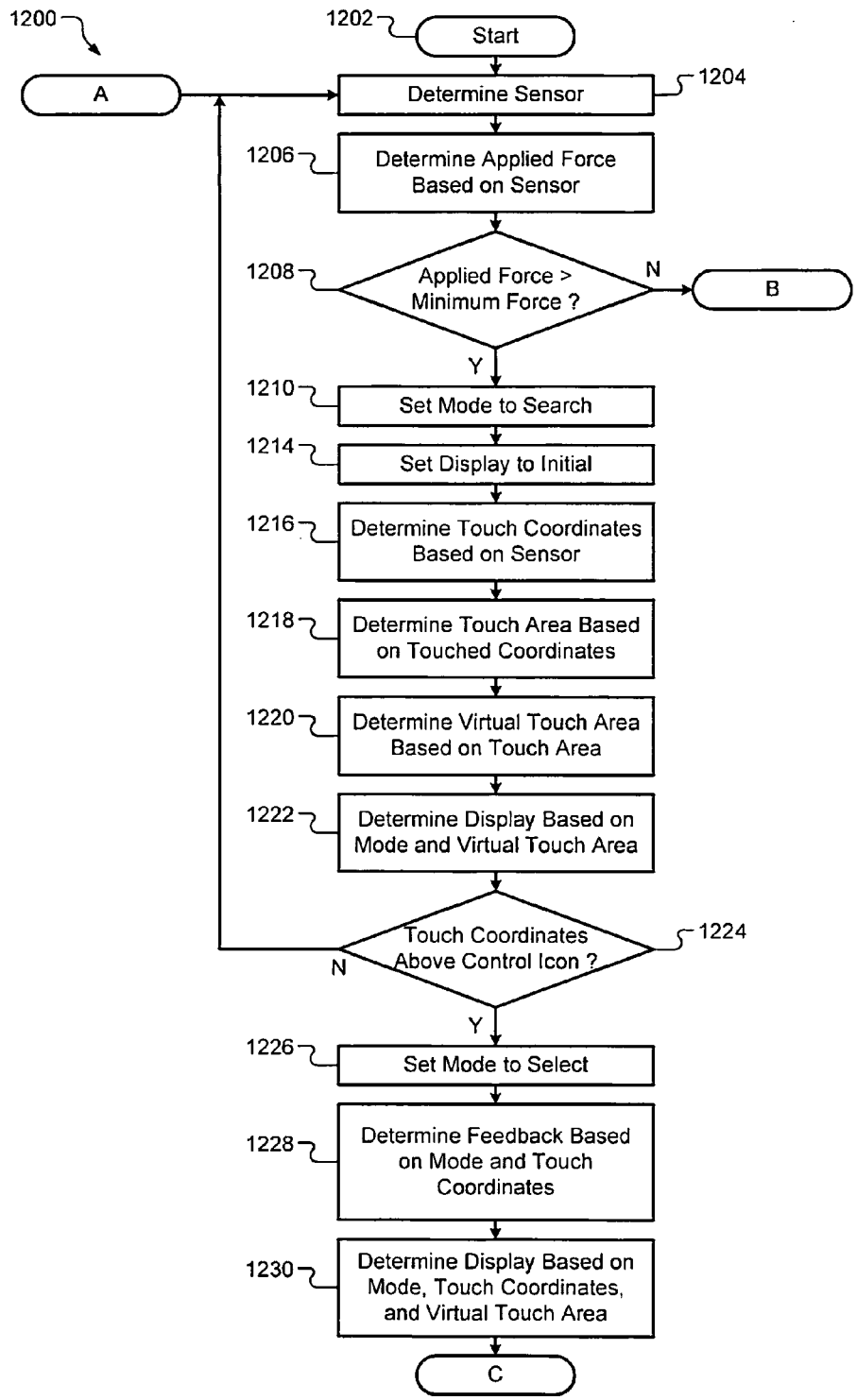
FIG. 10A is a flowchart depicting exemplary steps performed by a control module of the control interface system of FIG. 2 in accordance with an embodiment of the present invention.
Figure 10B:
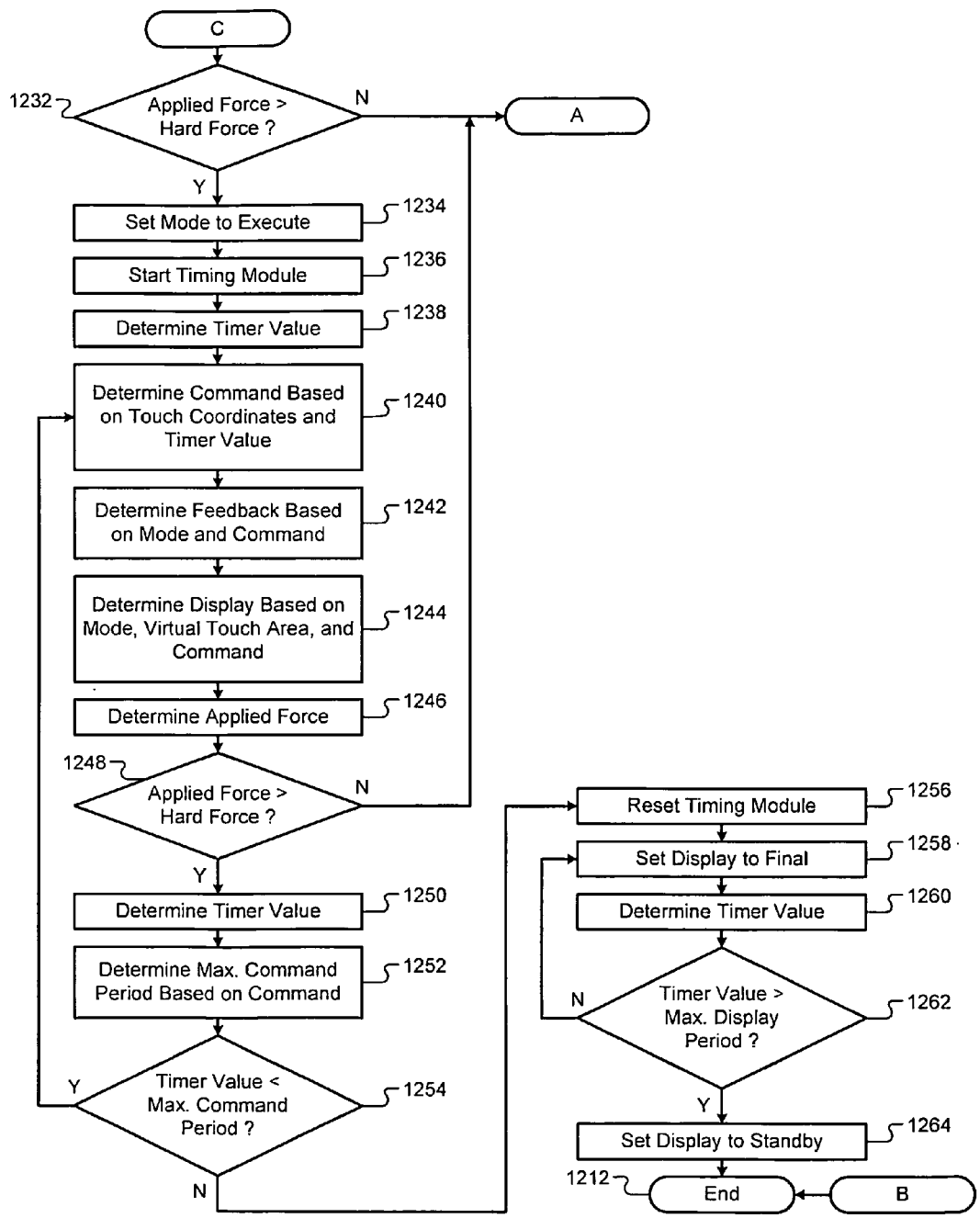
FIG. 10B is a portion of the flowchart of FIG. 10A.

Referring now to FIG. 10A and FIG. 10B, a flowchart 1200 depicts exemplary steps performed by the control module 118 of the control interface system 100. Control begins in step 1202. In step 1204, the sensor signal (i.e., Sensor) is determined.

In step 1206, the applied force is determined based on the sensor signal. In step 1208, control determines whether the applied force is greater than the minimum force. If true, control continues in step 1210. If false, control continues in step 1212.

In step 1210, the mode is set to the search mode (i.e., Search). In step 1214, the display signal (i.e., Display) is set to the initial signal (i.e., Initial). In step 1216, the touch coordinates are determined based on the sensor signal. In step 1218, the touch area is determined based on the touch coordinates.

In step 1220, the virtual touch area is determined based on the touch area. In step 1222, the display signal is determined based on the mode and the virtual touch area. In step 1224, control determines whether the touch coordinates are on the control icon. If true, control continues in step 1226. If false, control continues in step 1204.

In step 1226, the mode is set to the select mode (i.e., Select). In step 1228, the feedback signal (i.e., Feedback) is determined based on the mode and the touch coordinates. In step 1230, the display signal is determined based on the mode, the touch coordinates, and the virtual touch area.

In step 1232, control determines whether the applied force is greater than the hard force. If true, control continues in step 1234. If false, control continues in step 1204. In step 1234, the mode is set to the execute mode (i.e., Execute).

In step 1236, the timing module is started. In step 1238, the timer value is determined. In step 1240, the command signal is determined based on the touch coordinates and the timer value. In step 1242, the feedback signal is determined based on the mode and the command signal.

In step 1244, the display signal is determined based on the mode, the virtual touch area, and the command signal. In step 1246, the applied force is determined. In step 1248, control determines whether the applied force is greater than the hard force. If true, control continues in step 1250. If false, control continues in step 1204.

In step 1250, the timer value is determined. In step 1252, the maximum command period (i.e., Max Command Period) is determined based on the command signal. In step 1254, control determines whether the timer value is less than the maximum command period. If true, control continues in step 1240. If false, control continues in step 1256.

In step 1256, the timing module is reset. In step 1258, the display signal is set to the final signal (i.e., Final). In step 1260, the timer value is determined. In step 1262, control determines whether the timer value is greater than the maximum display period. If true, control continues in step 1264. If false, control continues in step 1258. In step 1264, the display signal is set to the standby signal (i.e., Standby). Control ends in step 1212.

Referring now to FIG. 11A, an exemplary screenshot 1300 depicts the input module 120 of the RHM 104 when the mode is the search mode. The input module 120 includes images of a default temperature control icon 1302-1, an increase temperature control icon 1302-2, a decrease temperature control icon 1302-3. The input module 120 further includes images of a default fan control icon 1302-4, an increase fan control icon 1302-5, and a decrease fan control icon 1302-6 (referred to collectively as control icons 1302).

The input module 120 further includes images of a temperature control value 1304-1 and a fan control value 1304-2 (referred to collectively as control values 1304). When a driver 1306 touches the input module 120 with the applied force that is greater than the minimum force, the mode is set to the search mode. The display signal is set to the initial signal that commands the input module 120 to display the images of the control icons 1302 and the control values 1304.

Continuing with FIG. 11B, an exemplary screenshot 1400 depicts the display 106 of the DIC module 102 when the mode is the search mode. The display 106 includes images of a default temperature display icon 1402-1, an increase temperature display icon 1402-2, a decrease temperature display icon 1402-3. The display 106 further includes images of a default fan display icon 1402-4, an increase fan display icon 1402-5, and a decrease fan display icon 1402-6 (referred to collectively as display icons 1402). The display 106 further includes images of a temperature display value 1404-1 and a fan display value 1404-2 (referred to collectively as display values 1404). The display 106 further includes an image of a virtual touch area 1406.

When the driver 1306 touches the input module 120 with the applied force that is greater than the minimum force, the display signal is set to the initial signal. The initial signal commands the display 106 to display images of the display icons 1402 and the display values 1404. After the virtual touch area 1406 is determined, the display signal is determined based on the mode and the virtual touch area 1406. When the mode is the search mode, the display signal commands the display 106 to display the images of the display icons 1402, the display values 1404, and the virtual touch area 1406.

Continuing with FIG. 12A, an exemplary screenshot 1500 depicts the input module 120 of the RHM 104 when the mode is the select mode. When the driver 1306 touches the increase temperature control icon 1302-2 with the applied force that is greater than the minimum force, the mode is set to the select mode. The feedback signal is determined based on the mode and the touch coordinates and commands the feedback module 126 to provide the feedback to the driver 1306.

Continuing with FIG. 12B, an exemplary screenshot 1600 depicts the display 106 of the DIC module 102 when the mode is the select mode. The display 106 includes a help image 1602 and an image of a virtual touch area 1604 that is centered at different virtual touch coordinates than those of the virtual touch area 1406. The display 106 further includes an image of an increase temperature display icon 1606 of a different color than the increase temperature display icon 1402-2.

When the driver 1306 touches the increase temperature control icon 1302-2 with the applied force that is greater than the minimum force, the display signal is determined based on the mode, the touch coordinates, and the virtual touch area 1604. When the mode is the select mode, the display signal commands the display 106 to display the images of the display icons 1402 and the display values 1404. The display signal further commands the display 106 to display the help image 1602 and the images of the virtual touch area 1604 and the increase temperature display icon 1606.

Figure 13A:
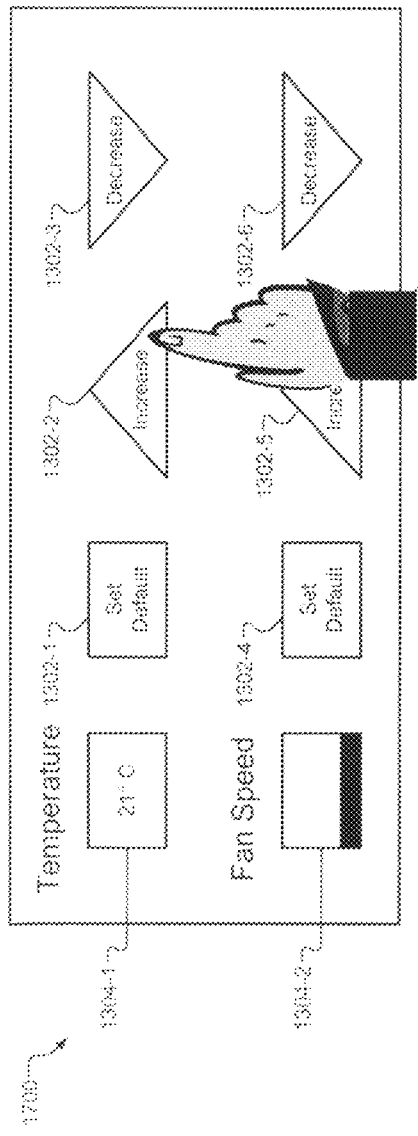
FIG. 13A is a screenshot illustrating the input module of FIG. 2 when the mode is an execute mode.

Continuing with FIG. 13A, an exemplary screenshot 1700 depicts the input module 120 of the RHM 104 when the mode is the execute mode. When the driver 1306 executes the command of the increase temperature control icon 1302-2, the mode is set to the execute mode. The feedback signal is determined based on the mode and the command signal and commands the feedback module 126 to provide the feedback to the driver 1306.

Figure 13B:
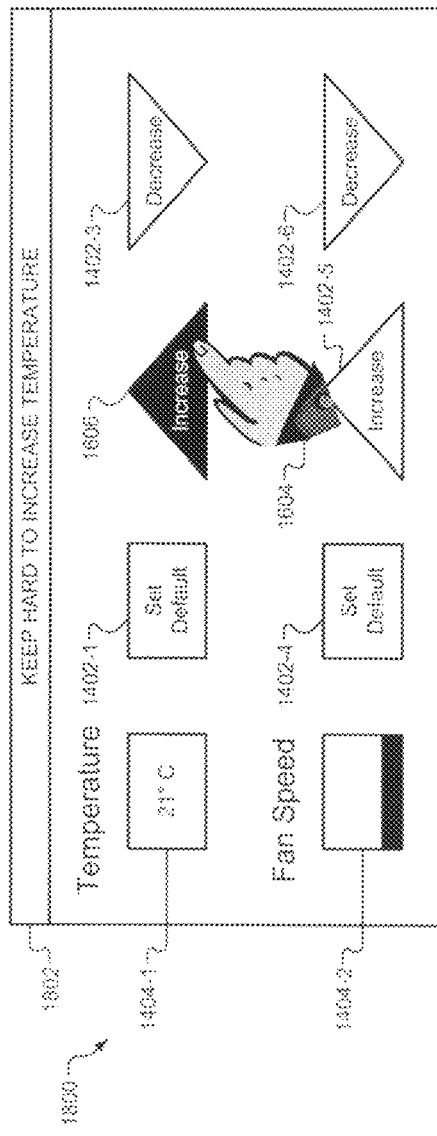
FIG. 13B is a screenshot illustrating the display of FIG. 2 when the mode is the execute mode.

Continuing with FIG. 13B, an exemplary screenshot 1800 depicts the display 106 of the DIC module 102 when the mode is the execute mode. The display 106 includes a help image 1802 that is different than the help image 1602. When the driver 1306 executes the command of the increase temperature control icon 1302-2, the display signal is determined based on the mode, the virtual touch area 1604, and the command signal. When the mode is the execute mode, the display signal commands the display 106 to display the images of the display icons 1402, the display values 1404, the virtual touch area 1604, and the increase temperature display icon 1606. The display signal further commands the display 106 to display the help image 1802.

In addition, the display signal commands the display 106 to increase the temperature display value 1404-1 in accordance with the command of the increase temperature control icon 1302-2. The display signal further commands the input module 120 of FIG. 13A to increase the temperature control value 1304-1 in accordance with the command of the increase temperature control icon 1302-2.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A control interface system for a driver of a vehicle, comprising:
    a touchscreen located proximate to the driver of the vehicle and, upon driver interaction therewith, operable to generate a sensor signal;
    a control module adapted to receive the sensor signal from the touchscreen and operable to initiate control of a vehicle function and to generate a feedback signal in response thereto, wherein the touchscreen is adapted to receive the feedback signal from the control module and is operable to provide a first and a second vibrational feedback to the driver of the vehicle in response thereto, the control module determines touch coordinates based on the sensor signal from the touchscreen; and
    a display embedded in an instrument panel of the vehicle remote from the touchscreen, the display displaying an indicia of the vehicle function controlled by the touchscreen and, by driver interaction therewith, a surface of the display being a virtual image of a surface of the touchscreen, wherein
    the control module sets a search mode when the driver interaction includes touching the touchscreen with an applied force greater than a minimum force;
    the control module sets a select mode after selecting the search mode when the touch coordinates of the applied force is determined to be located above a control icon of the indicia on the display;
    the control module provides the first vibrational feedback to the driver after setting the select mode when the touch coordinates of the applied force is determined to be located above the control icon of the indicia on the display;
    the control module sets an execute mode after selecting the select mode when the driver interaction includes touching the touchscreen with an applied force greater than a hard force, the hard force being greater than the minimum force;
    the control module executes the control of the vehicle function when the applied force greater than the hard force is maintained for a specific period of time;
    the control module provides the second vibrational feedback, different from the first vibrational feedback, to the driver after the applied force greater than the hard force is maintained for the specified period of time;
    the control module, in the search mode, determines a touch area of the touchscreen in which the applied force is greater than the minimum force and determines a virtual touch area on the virtual image corresponding to the touch area on the touchscreen, and the display provides an image of the virtual touch area on the virtual image along with the indicia of the vehicle function during the search mode;
    the control module determines the feedback signal based on the touch coordinates when the touch coordinates are above the control icon of the indicia on the display, and the control module provides different vibration feedbacks based on the touch coordinates; and
    the control module configures the feedback signal to include at least two of a haptic feedback, an audio feedback, and a visual feedback, wherein the visual feedback includes an image to instruct the driver of the driver interaction.

2. The control interface system of claim 1 wherein the control module is in data communication with the display and operable to initiate control of the vehicle function as indicated on the display.

3. The control interface system of claim 1 wherein the touchscreen includes the control icon upon driver interaction therewith operable to generate the sensor signal.

4. The control interface system of claim 3 wherein the display provides an indicia of the control icon currently selectable via the touchscreen.

5. The control interface system of claim 3 wherein the control module determines the applied force on the touchscreen based on the sensor signal.

6. The control interface system of claim 5 wherein the control module generates the feedback signal when the applied force is applied to the control icon.

7. The control interface system of claim 6 wherein the display provides an indicia of the control icon currently selected via the touchscreen.

8. The control interface system of claim 5 wherein the control module initiates control of the vehicle function when the applied force is applied to the control icon, removed from the control icon, and reapplied to the control icon within a predetermined time.

9. The control interface system of claim 8 wherein the display provides an indicia of the control icon currently executed via the touchscreen.

10. The control interface system of claim 1 wherein the touchscreen includes at least one imbedded switch operable to generate the sensor signal upon actuation thereof.

11. The control interface system of claim 1 wherein the touchscreen includes at least one imbedded actuator operable to generate the sensor signal upon driver interaction therewith, adapted to receive the feedback signal from the control module, and operable to provide the first and second vibrational feedback to the driver of the vehicle in response thereto.

12. A control interface system for a driver of a vehicle, comprising:
    a touchscreen located proximate to the driver of the vehicle that includes at least one control icon upon driver interaction therewith operable to generate a sensor signal;
    a control module adapted to receive the sensor signal from the touchscreen and operable to initiate control of a vehicle function and to generate a feedback signal in response thereto, wherein the touchscreen is adapted to receive the feedback signal from the control module and is operable to provide a first and a second vibrational feedback to the driver of the vehicle in response thereto, the control module determines touch coordinates based on the sensor signal from the touchscreen; and
    a display embedded in an instrument panel of the vehicle remote from the touchscreen, the display displaying an indicia of the vehicle function controlled by the touchscreen and, by driver interaction therewith, a surface of the display being a virtual image of a surface of the touchscreen; wherein
    the control module sets a search mode when the driver interaction includes touching the touchscreen with an applied force greater than a minimum force;

the control module sets a select mode after selecting the search mode when the touch coordinates of the applied force is determined to be located above a control icon of the indicia on the display;

the control module provides the first vibrational feedback to the driver after setting the select mode when the touch coordinates of the applied force is determined to be located above the control icon of the indicia on the display;

the control module sets an execute mode after selecting the select mode when the driver interaction includes touching the touchscreen with an applied force greater than a hard force, the hard force being greater than the minimum force;

the control module executes the control of the vehicle function when the applied force greater than the hard force is maintained for a specific period of time;

the control module provides the second vibrational feedback, different from the first vibrational feedback, to the driver after the applied force greater than the hard force is maintained for the specified period of time;

the control module, in the search mode, determines a touch area of the touchscreen in which the applied force is greater than the minimum force and determines a virtual touch area on the virtual image corresponding to the touch area on the touchscreen, and the display provides an image of the virtual touch area on the virtual image along with the indicia of the vehicle function during the search mode;

the control module determines the feedback signal based on the touch coordinates when the touch coordinates are above the control icon of the indicia on the display, and the control module provides different vibration feedbacks based on the touch coordinates; and the control module configures the feedback signal to include at least two of a haptic feedback, an audio feedback, and a visual feedback, wherein the visual feedback includes an image to instruct the driver of the driver interaction.

13. The control interface system of claim 12 wherein the control module is in data communication with the display and operable to initiate control of the vehicle function as indicated on the display.

14. The control interface system of claim 12 wherein the display provides an indicia of the control icon currently selectable via the touchscreen.

15. The control interface system of claim 12 wherein the control module determines the applied force on the touchscreen based on the sensor signal.

16. The control interface system of claim 15 wherein the display provides an indicia of the control icon currently selected via the touchscreen.

17. The control interface system of claim 15 wherein the control module initiates control of the vehicle function when the applied force is applied to the control icon, removed from the control icon, and reapplied to the control icon within a predetermined time.

18. The control interface system of claim 17 wherein the control module generates the feedback signal.

19. The control interface system of claim 17 wherein the display provides an indicia of the control icon currently executed via the touchscreen.

20. The control interface system of claim 12 wherein the touchscreen includes at least one imbedded switch operable to generate the sensor signal upon actuation thereof.

21. The control interface of system of claim 12 wherein the touchscreen includes at least one imbedded piezo device upon driver interaction therewith operable to generate the sensor signal, adapted to receive the feedback signal from the control module, and operable to provide the first and second vibrational feedback to the driver of the vehicle in response thereto.

22. The control interface system of claim 11, wherein the at least one actuator is one of a piezo device or an electroactive polymer.

23. The control interface system of claim 12, wherein the controller enables/disables the feedback to the driver.

24. The control interface system of claim 1, wherein, in the search mode, the virtual touch area provided by the display on the virtual image is different from the indicia of the vehicle function provided by the display.

25. The control interface system of claim 12, wherein, in the search mode, the virtual touch area provided by the display on the virtual image is different from the indicia of the vehicle function provided by the display.

* * * * *

UNITED STATES PATENT AND TRADEMARK OFFICE
CERTIFICATE OF CORRECTION

PATENT NO.        : 9,056,549 B2
APPLICATION NO.   : 12/079871
DATED             : June 16, 2015
INVENTOR(S)       : Silviu Pala et al.

Page 1 of 1

It is certified that error appears in the above-identified patent and that said Letters Patent is hereby corrected as shown below:

In the Claims

Col. 14, line 7, claim 1, "interaction" should be --interaction to apply a force greater than the hard force to execute a vehicle function--; and Col. 15, line 39, claim 12, "interaction" should be --interaction to apply a force greater than the hard force to execute a vehicle function--.

Signed and Sealed this
Twenty-fourth Day of November, 2015

Michelle K. Lee
*Director of the United States Patent and Trademark Office*